(12) United States Patent
Roogi

(10) Patent No.: US 11,946,670 B2
(45) Date of Patent: Apr. 2, 2024

(54) AUTOMATED SYSTEM FOR CLEANING SOLAR PANEL

(71) Applicant: AEGEUS TECHNOLOGIES PRIVATE LIMITED, Bengaluru (IN)

(72) Inventor: Praful Roogi, Bengaluru (IN)

(73) Assignee: AEGEUS TECHNOLOGIES PRIVATE LIMITED, Karnataka (IN)

( * ) Notice: Subject to any disclaimer, the term of this patent is extended or adjusted under 35 U.S.C. 154(b) by 505 days.

(21) Appl. No.: 17/276,826

(22) PCT Filed: Sep. 18, 2019

(86) PCT No.: PCT/IB2019/057840
§ 371 (c)(1),
(2) Date: Mar. 17, 2021

(87) PCT Pub. No.: WO2020/058857
PCT Pub. Date: Mar. 26, 2020

(65) Prior Publication Data
US 2022/0049877 A1  Feb. 17, 2022

(30) Foreign Application Priority Data
Sep. 18, 2018 (IN) .............................. 201841035203

(51) Int. Cl.
*F24S 40/20* (2018.01)
*B08B 1/04* (2006.01)

(52) U.S. Cl.
CPC ................ *F24S 40/20* (2018.05); *B08B 1/04* (2013.01); *Y02E 10/40* (2013.01)

(58) Field of Classification Search
CPC .......... F24S 40/20; H02S 40/10; B08B 3/024; B08B 1/008; B08B 1/04
USPC .................................................. 15/21.1, 97.1
See application file for complete search history.

(56) References Cited

U.S. PATENT DOCUMENTS

| | | | |
|---|---|---|---|
| 2013/0206173 A1* | 8/2013 | Zijlstra ................... | B08B 3/024 134/6 |
| 2014/0109334 A1* | 4/2014 | Saraf ....................... | B08B 1/008 15/246 |
| 2015/0244311 A1* | 8/2015 | Nakagawa ............... | B08B 1/04 134/180 |

FOREIGN PATENT DOCUMENTS

WO  WO-2016017852 A1 * 2/2016 ............. H02S 40/10

\* cited by examiner

*Primary Examiner* — Katina N. Henson

(57) ABSTRACT

A system 100 for cleaning solar panels 304 arranged in a row includes a frame 102, rotating members 106 and a stationary brush 110. The frame 102 moves along the row of solar panels 304. The rotating members 106 interfaces with surface of the solar panel 304. An axis of rotation of the rotating members 106 is incident at an angle to the solar panels 304. The plurality of rotating members 106 are connected to the frame 102 to move with the frame 102 along the row of solar panels 304. The stationary brush 110 is engaged to the frame 102. The brush 110 interfaces with the surface of the solar panel 304 to unsettle foreign particles present on the surface of the solar panel 304, as the frame 102 traverses along the row of solar panels 304.

6 Claims, 9 Drawing Sheets

AUTOMATED SYSTEM FOR CLEANING SOLAR PANEL

BACKGROUND

Unless otherwise indicated herein, the materials described in this section are not prior art to the claims in this application and are not admitted to being prior an by inclusion in this section.

Field of the Invention

The subject matter in general relates to cleaning of solar panels. More particularly, but not exclusively, the subject matter relates to a robot for cleaning of the solar panels.

Discussion of the Related Field

The demand for energy is increasing day by day. It is challenging to meet the upcoming demand by relying on non-renewable energy sources as there is limited supply. To meet the existing demand, we need to concentrate on various other sources of energy like the renewable energy forms viz. solar, wind, hydropower and biomass, among others.

Solar energy is one form non-renewable energy source, which can be utilised to meet the upcoming demand. Solar energy can be converted to usable form like electricity using PV cells. These PV cells are stacked together to form a solar panel. These solar panels are installed in numbers to generate the required energy. Solar panels, as is well known, are installed mainly in open space. The solar panels are exposed to intense dust and other foreign particles, resulting in soiling, thereby reducing the efficiency of the solar panels. This creates a challenge of keeping the solar panel clean to achieve consistent output.

Several methods are adopted to clean the solar panels, some of which include manual cleaning. In manual cleaning, human labour cleans the solar panels using handheld cleaning articles, such as a mop. Apart from manual cleaning, machine assisted cleaning also exists. In such a technique, an individual cleans the solar panels using a machine, which the individual guides along the solar panels.

The above discussed techniques are generally acceptable when the quantity of panels to be cleaned is relatively less. However, to produce large quantum of energy output, solar panels are generally installed in masses spread across vast area. Cleaning such large deployment of solar panels employing the above discussed techniques is inefficient and impacts profitability of the installation. Maintenance cost increases as the number of workers required to clean the solar panels increase.

Additionally, in these techniques, water is primarily used to clean the solar panels, which results in consumption of another non-renewable source. Further, there would be a need of an additional setup for the storage of water and a pump setup to deliver water from the reservoir to the nozzle. This adds to the cost of the cleaning unit, as well as the maintenance cost.

There are some alternative solution wherein automated robots are used to clean the solar panels. These robots employ elongated rotating circular brushes, whose rotating axis is parallel to the surface of solar panels. The length of such brushes is fixed, thereby limiting the usage of such robots to a particular dimension of solar panels. A whole new setup would have to be manufactured to suit to each requirement. Also, some of the suspended dust tend to settle back on the panel as the rotation of the circular brush is also in the direction of movement of to the robot.

In view of the foregoing, there is a need for an alternative solution, which s simple, cost efficient, time efficient and eco-friendly.

SUMMARY

An embodiment provides a system for cleaning solar panels arranged in a row. The system comprises a frame configured to traverse along the row of solar panels. The frame comprises a plurality of rotating members interfacing with surface of the solar panel, wherein the axis of rotation of the rotating members is incident at an angle to a plane of the solar panels. The plurality of rotating members are connected to the frame to move with the frame along the row of solar panels. A stationary brush is engaged to the frame, wherein the brush interfaces with the surface of the solar panel to unsettle foreign particles present on the surface of the solar panel, as the frame traverses along the row of solar panels. The part of the frame to which the stationary brush is engaged to, defines a plurality of ports to suck air into the hollow frame and the portion of the frame opposite to the part of the frame to which the stationary brush is engaged to, accommodates a plurality of air blowers. The frame may allow passage of the air sucked by the plurality of ports to the plurality of air blowers. The system also comprises of pair of sensors, wherein at least one sensor is disposed on leading side of the frame and at least one sensor is disposed on the trailing end of the frame.

BRIEF DESCRIPTION OF DRAWINGS

Embodiments are illustrated by way of example and not limitation in the figures of the accompanying drawings, in which like references indicate similar elements and in which.

DETAILED DESCRIPTION

The following detailed description includes references to the accompanying drawings, which form a part of the detailed description. The drawings show illustrations in accordance with example embodiments. These example embodiments, which may be herein also referred to as "examples" are described in enough detail to enable those skilled in the art to practice the present subject matter. However, it may be apparent to one with ordinary skill in the art, that the present invention may be practised without these specific details. In other instances, well-known methods, procedures and components have not been described in detail so as not to unnecessarily obscure aspects of the embodiments. The embodiments can be combined, other embodiments can be utilized, or structural, logical, and design changes can be made without departing from the scope of the claims. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

Figure 7:
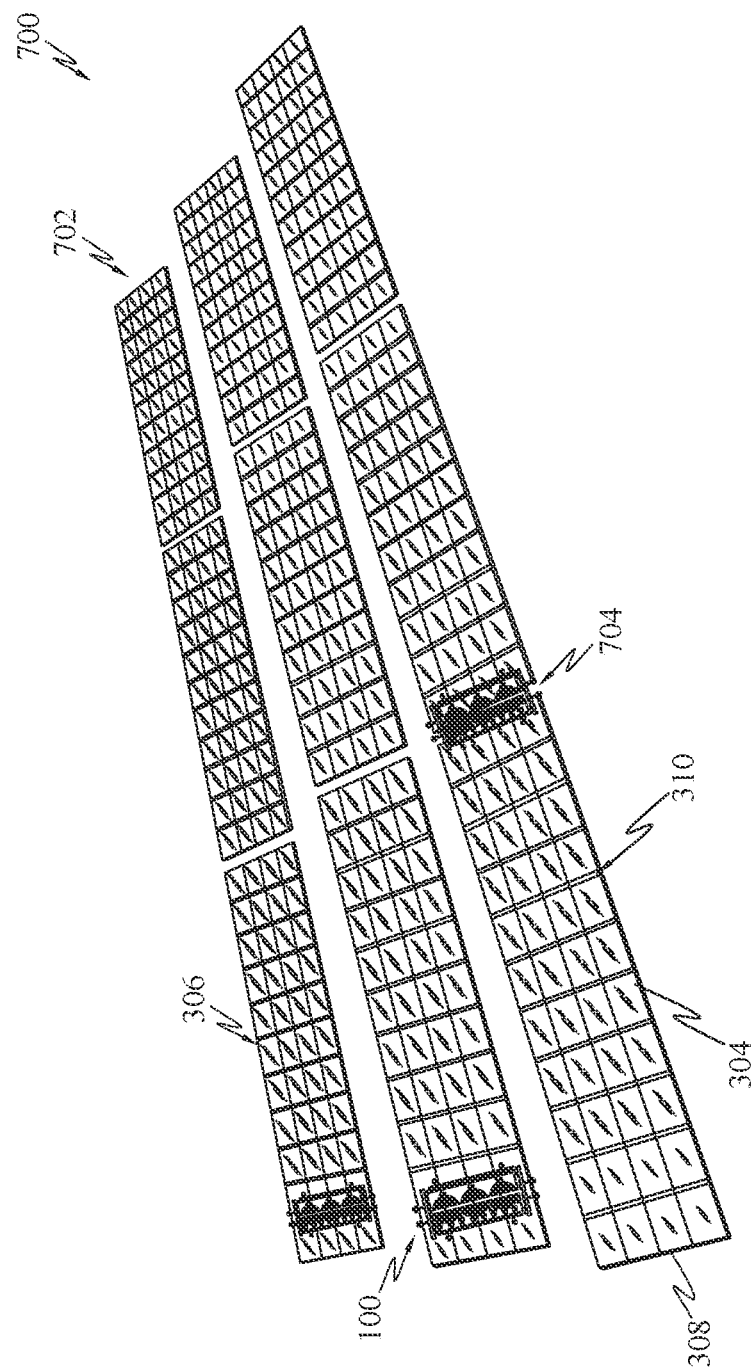
FIG. 7 illustrates a solar farm 700 in which multiple systems 100 are deployed, in accordance with an embodiment.

Referring to the figures, and more specifically to FIG. 7 an environment, such as a solar farm 700 in which systems 100 may be deployed for cleaning solar panels is illustrated. The solar farm 700 has solar panels 304 arranged in multiple rows 702. In each of the rows 702, may have multiple solar tables 306. Each solar table 306 may have multiple solar panels 304 grouped together. There can be gap 310 between adjacent columns of solar panels 304, and there can be gap 704 between adjacent solar tables 306 deployed in a row 702. Each of the rows 702 may be provided with a system 100 to clean the solar panels 304 deployed in the respective row 702. The system 100 traverses along the row 702, while overcoming the gap 310 between adjacent columns of solar panels 304 and the gap 704 between adjacent solar tables 306. The system 100 cleans the solar panels 304 as it traverses along the row 702 of solar panels 304.

Figure 1A:
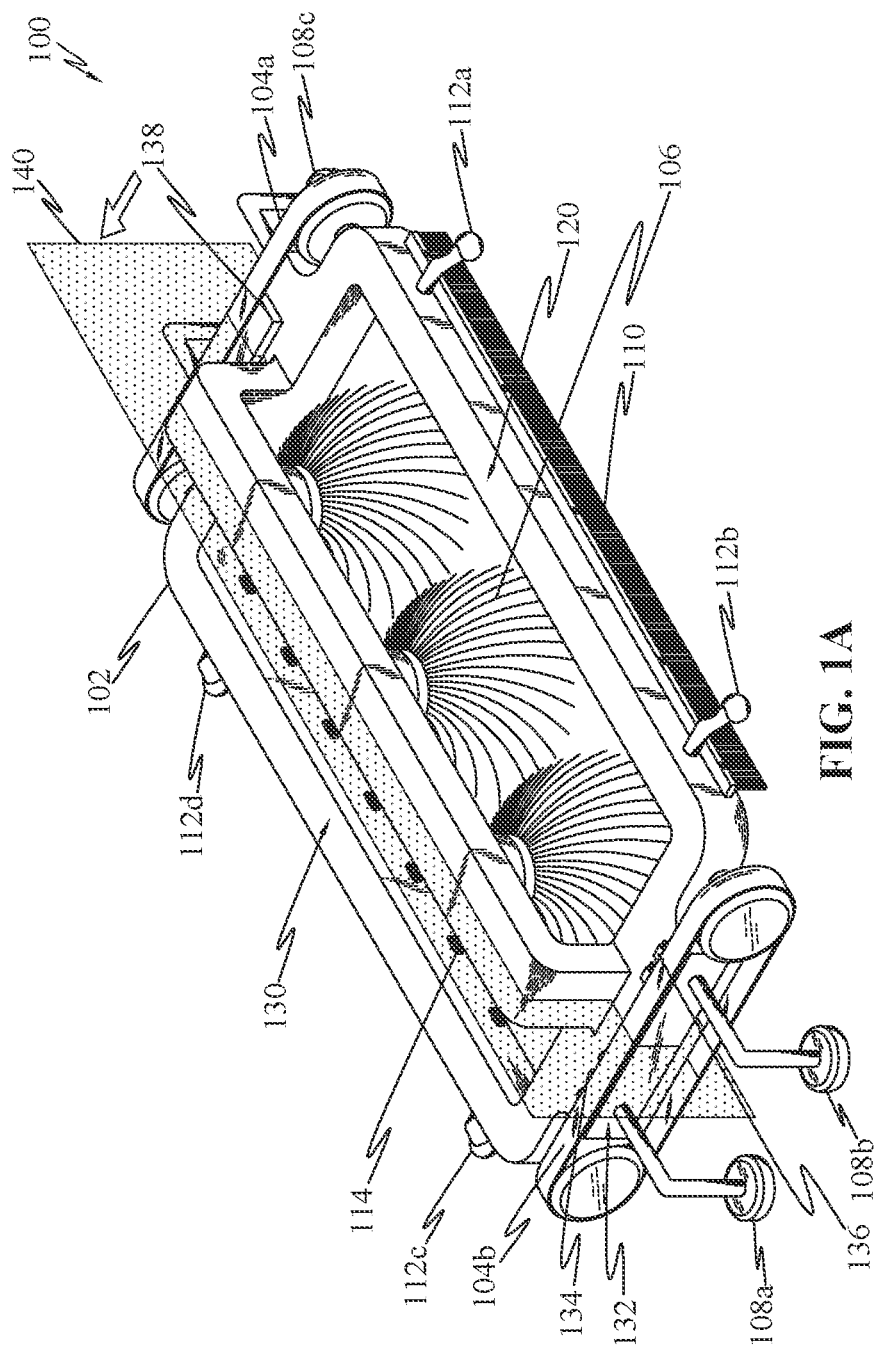
FIG. 1A is an isometric front view of system 100 for cleaning of solar panels arranged in rows, in accordance with an embodiment.
Figure 1B:
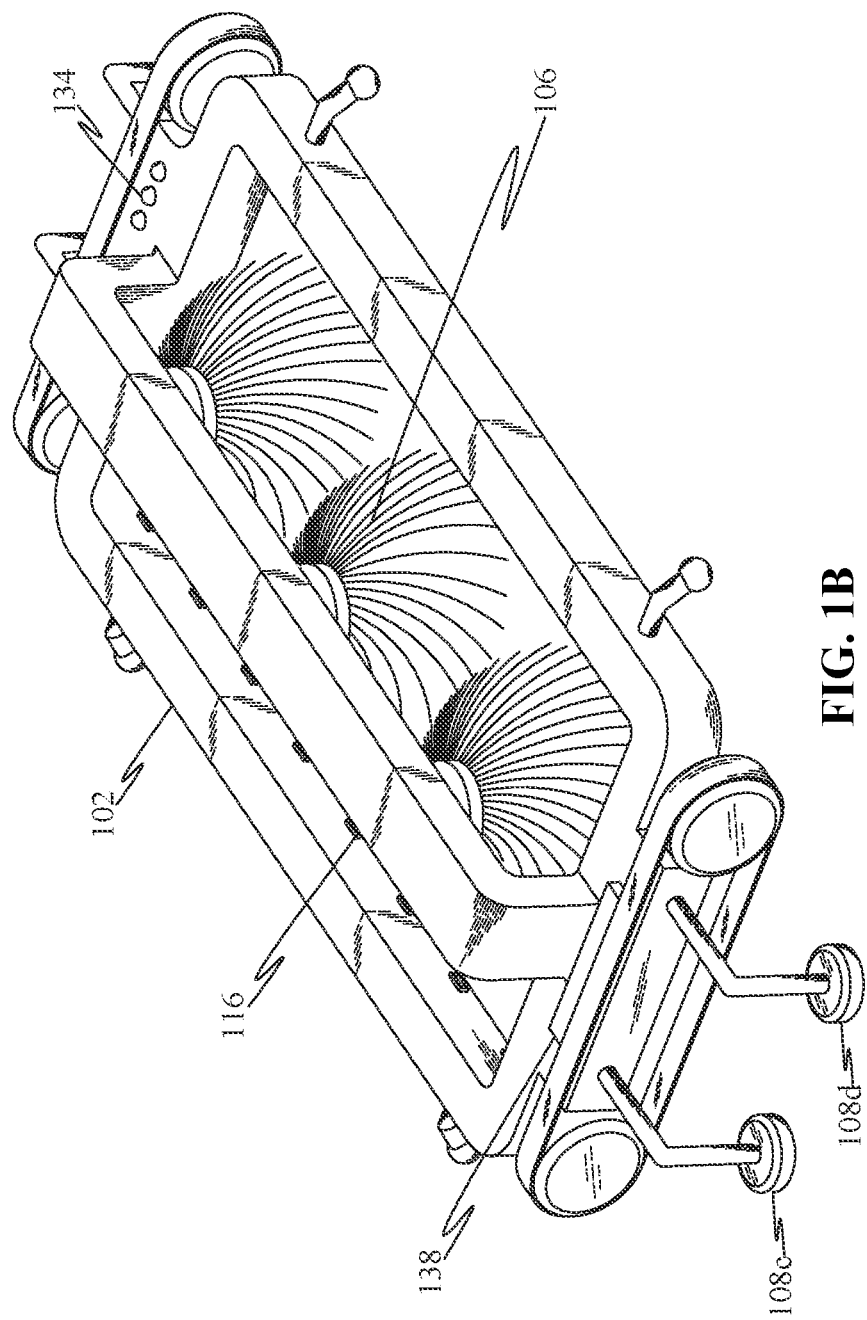
FIG. 1B is an isometric back view of the system 100 of FIG. 1A, depicting suction ports 116 positioned towards leading side 120 of the frame 102.

Referring to FIGS. 1A-1B, the system 100 for cleaning the solar panels arranged in a row is discussed in greater detail. The system 100 includes a frame 102, rotating members 106, continuous tracks 104a and 104b, support wheels 108a, 108b, 108c, 108d, a stationary, brush 110, sensors 112a, 112b, 112c, 112d, suction ports 116, a filter unit (not shown in drawing), air blowers 114 and a motor (not shown in drawing).

The parts of the system 100 referred above are configured to co-operate with each other to facilitate cleaning of the solar planes along a row. Specifically, the frame 102 supports for the rest of the parts of the system 100. The movement of the frame 102 along the row of solar panels is enabled by the continuous tracks 104a and 104b, which is driven by the motor. The support wheels 108a, 108b, 108c, 108d on the other hand, provides stability as the system traverses along the row.

While, the continuous tracks 104 and the support wheels 108 enable traversing of the system 100 along the row of solar panels 304, the cleaning of the solar panels 304 is enabled by the stationary brush 110 and the rotating members 106. The stationary brush 110 provides the initial cleaning of the solar panel 304 by unsettling the foreign particles from the surface of the solar panels 304. The suction ports 116 suck in the mixture of air and the foreign particles, which are unsettled by the stationary brush 110. The filter unit filters the air with foreign particles therein. Dust free air is made available at the other end of the filter unit by isolating the foreign particles from the air. The filtered air is supplied to the air blowers 114, which are positioned behind the rotating members 106. The filtered air is blown through the air blowers 114 to blow away the foreign particles unsettled by the rotating members 106. The air blown through the air blowers 114 may also blow away the foreign particles unsettled by stationary brush 110, which may not have been sucked in by the suction ports 116.

Movement of the System along a Row of Solar Tables

The configuration of the system 100, which enables movement of the system 100 along the row of solar panels 304 is now discussed in greater detail. The movement of the system 100 is primarily enabled by the continuous tracks 104. Each of the continuous tracks 104 may be disposed on either side of the frame 102. In an embodiment, each continuous track 104 comprise of a plurality of wheels which drive a continuous band. Although in the figure, only two wheels are shown, there can be more than two wheels arranged adjacent each other by providing gaps therein to allow free rotation of the wheels, while ensuring that the continuous band is well supported underneath. The continuous band may be formed by thread or track plate. Alternatively, the band may be made of polymer-based material which allow the system 100 to grip on to the surface of the solar panel 304 eliminating the chances of sliding of the system 100.

Figure 3:
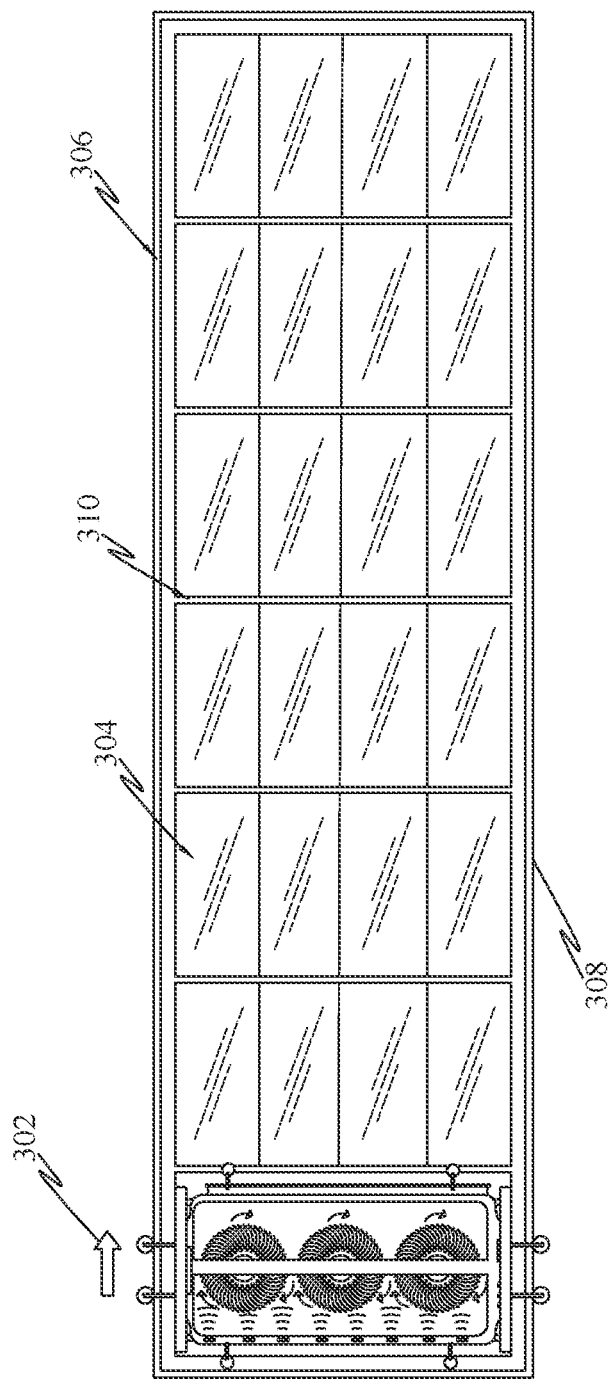
FIG. 3 is an orthographic view of the system 100 cleaning a row of solar panels 304, in accordance with an embodiment.

It may be noted that, as recited earlier, and illustrated in FIG. 3 and FIG. 7, solar panels 304 are arranged in rows over a solar table 306. Gap 310 and gap 704 may exist between adjacent solar panels 304 and solar tables 306, respectively. Continuous tracks 104 enable the system 100 to traverse over the solar panel 304 and also the solar table 306 with ease, by navigating over the gaps 310, 704. Hence, the system 100 can be used in solar farms, which have a range of such gaps, without requiring customization to either the system 100 or the installations in the solar farm. Further, the continuous band allow the system 100 to stay intact on the surface of the solar panel 304. Furthermore, the weight of the system 100 is relatively well distributed over the surface of the solar panel 304, thereby eliminating point load which may cause stress on the solar panel 304.

Figure 4:
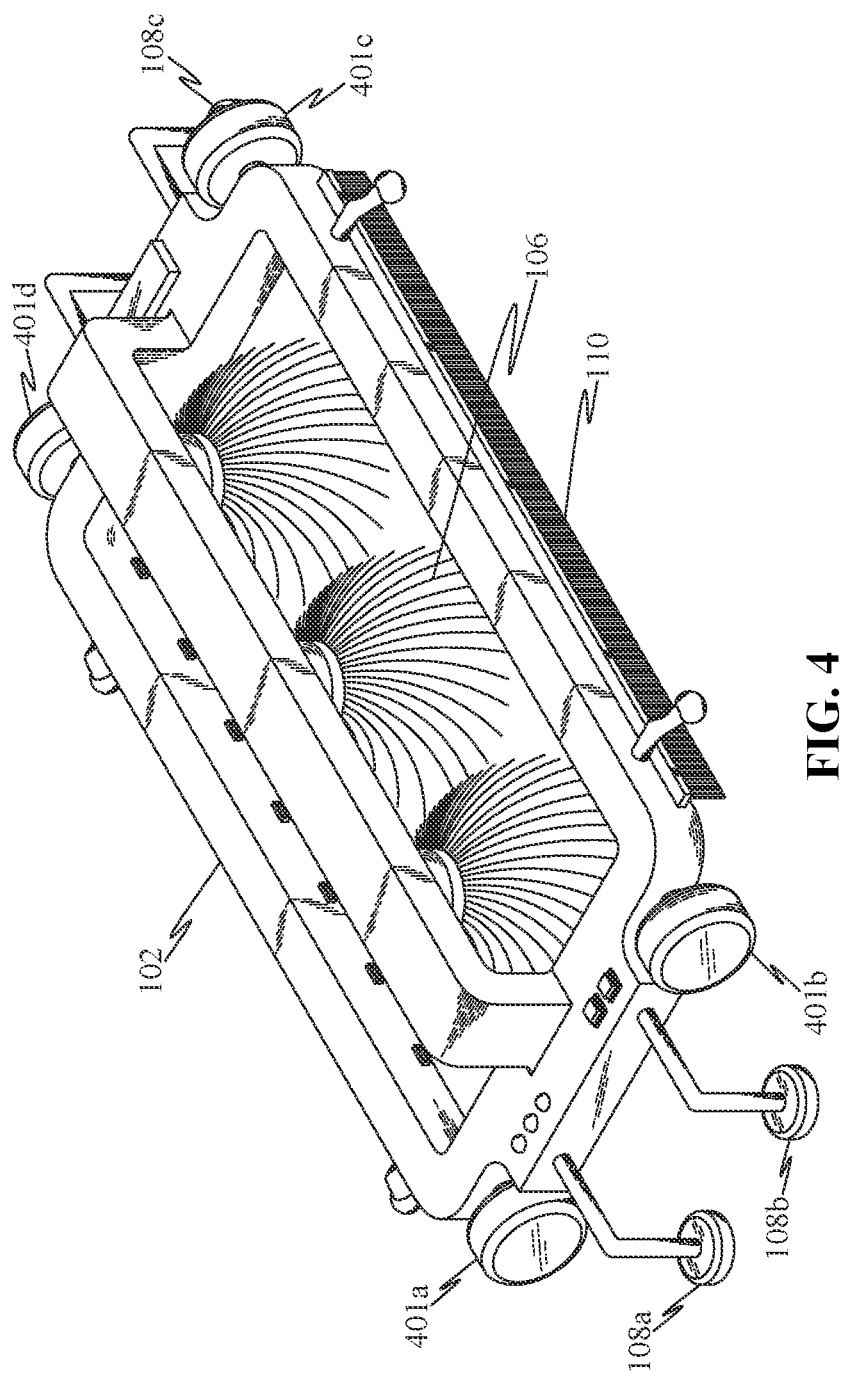
FIG. 4 is an isometric view of an alternative embodiment of the system 100, illustrating a pair of wheels 401a, 401b, 401c, 401d disposed on opposite sides of the frame 102.

In an alternate embodiment, as illustrated in FIG. 4, pair of wheels 401 are employed in lieu of the continuous tracks 104.

While the continuous tracks 104 or the wheels 401 enable movement of the system 100, it shall be noted that there is a need to keep the system 100 on its course. This is specifically required since the solar panels 304 are inclined and there are chances of the system 100 being dislodged from the intended course. Such a stability may be provided by support wheels 108. A pair of support wheels 108 may be disposed on either side of the frame 102. Support wheels 108 may be engaged to the frame 102. The support wheels 108 rests on the edge 308 of the solar table 306, as can be clearly viewed in FIG. 3. The axis of rotation of the support wheels 108 is inclined at an angle to the solar table 306. The employment of the support wheels 108 provide additional grip and support to the system 100, by way of side support. The support wheels 108 glide along the edge 308 of the solar table 306, as the system 100 traverses along the row of solar panels 304.

Cleaning of Solar Panels

Configuration of the system 100, which enables cleaning of the solar panels 304, as the system 100 traverse along row of solar tables 306 is now discussed in greater detail.

Referring more particularly to FIGS. 1A-4, the system 100 comprises rotating members 106 to achieve cleaning of the solar panels 304 for most part. The rotating members 106 may include strands, which may be of microfibre material. Using such soft material limits abrasion, thereby limiting the risk of harming the surface of solar panels 304 with scratches. As the system 100 traverse along the row of solar panel 304 the rotating members 106 rotate about its axis, thereby unsettling the foreign particles from the surface of the solar panel 304.

The rotating members 106 may be detachably attached to the shaft 202 that runs along the length of the system 100.

In an embodiment, axis of rotation of the rotating members 106 is inclined to the surface of the solar panels 304. In other words, axis of rotation of the rotating members 106 is not parallel to the surface of the solar panels 304.

Figure 6:
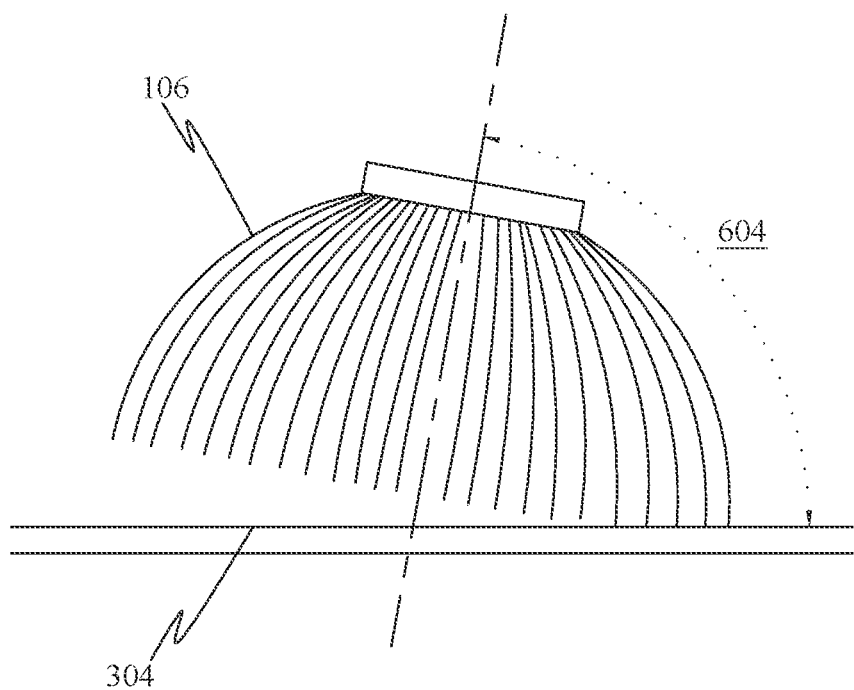
FIG. 6 illustrates an angle of incidence 604 of an axis of rotation of the rotating member 106 with the surface of a solar panel 304.

In an embodiment, referring to FIG. 6, the axis 602 of rotation of the rotating members 106 is oblique to the surface of the solar panel 304. The oblique angle 604 provides better interface between the rotating members 106 and the surface of the solar panels 304. The improved interface is in terms of the scooping effect that is generated as the rotating members 106 rotate. The foreign particles are scooped and momentarily suspended in the air, which is then blown away (discussed later), thereby increasing the efficiency of cleaning.

The oblique angle of incidence may be achieved by known methods. Such methods include employing a spring, wall-nut and gear arrangement. Employment of spring allow the rotating members 106 to be flexible when they interface with the surface of the solar panels 304.

Figure 5:
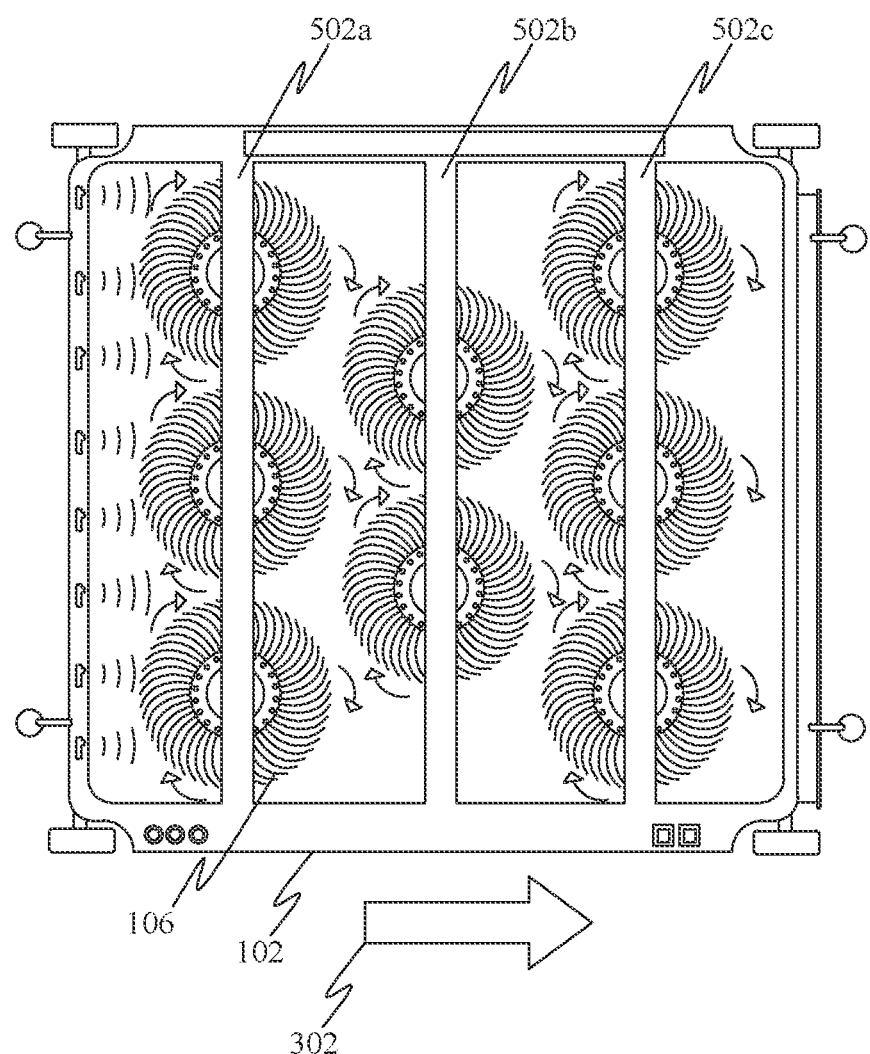
FIG. 5 is an orthographic view of an alternative embodiment of the system 100 to illustrating multiple rows 502a, 502b, 502c of rotating members 106.

FIG. 1A-4, illustrates a configuration in which the rotating members 106 are arranged in a single row. A gap is maintained between two rotating members 106 in a single row so that the strands of the rotating members 106 do not entangle. Such a configuration may result in relative inferior cleaning of the surface of the solar panels 304 that is aligned with the gap. An alternate configuration of the rotating members 106 is disclosed, in conjunction with FIG. 5, to address the problem. In the embodiment of FIG. 5 a plurality of rotating members 106 that may be detachably attached to shaft 202 are deployed in multiple rows 502a, 502b, 502c. The rotating members 106 in a row 502b are positioned between the rotating members 106 of the adjacent row 502a, 502c. This enables efficient cleaning, as the area of the solar panel 304 that is left out by the rotating members 106 in a row, is cleaned by rotating members 106 of the adjacent row, as the system 100 moves in the cleaning direction 302.

In addition to the rotating members 106 enabling cleaning of the solar panels 304, the cleaning effort is complemented by the stationary brush 110, as recited earlier. The stationary brush 110 is engaged on the leading side 120 of the frame 102. The stationary brush 110 comprises of fine bristles (e.g., made of polymer material), which interface with the surface of the solar panel 304. A single stationary brush 110 or a plurality of brush 110 are disposed along the length of the system 100. The initial unsettling of the foreign particles from the surface of the solar panels 304 is achieved by the stationary brush 110.

A plurality of suction ports 116 are disposed along the length of the frame 102 on the leading side 120 of the frame 102, behind the stationary brush 110. Suction ports 116 are configured to suck in mixture of air and the foreign particles that are unsettled by the stationary brush 110.

A filter unit (not shown in figure) is also configured with the frame 102. The filter unit may be positioned between the plurality of the suction ports 116 and the plurality of the air blowers 114 within the frame 102. Air sucked in from the suction ports 116 pass through the filter unit. The filter unit isolates the foreign particles from the air. Dust free air is made available at the other end of the filter unit. Filter unit can be replaced/cleaned over an interval of time as a part of maintenance.

A plurality of air blowers 114 are disposed along length of the frame 102 towards the trailing side 130 of the frame 102 behind the rotating members 106. As system 100 traverses along the row of solar panels 304, the stationary brush 110 and the rotating members 106 interface with the surface of the solar panels 304 unsettling the foreign particles. The air that is sucked in from the suction port 116 passes through the filter unit and blown through the air blowers 114. The frame 102 is configured with the passage allowing the air to pass from the suction ports 116 to the air blowers 114. Air blowers 144 are positioned behind the rotating members 106 to blow off the unsettled foreign particles that are suspending in air thereby resulting in effective cleaning of the solar panels 304.

In an embodiment, the frame 102 may be hollow at least in part. The hollow portion of the frame 102 functions as a conduit for movement of air sucked in by the suction ports 116 to the air filter. Further, air exiting the air filter may be transferred to the air blowers 114 via another hollow portion of the frame 102, which again functions as a conduit for movement of air from the air filter or air pump to the air blowers 114.

Figure 8:
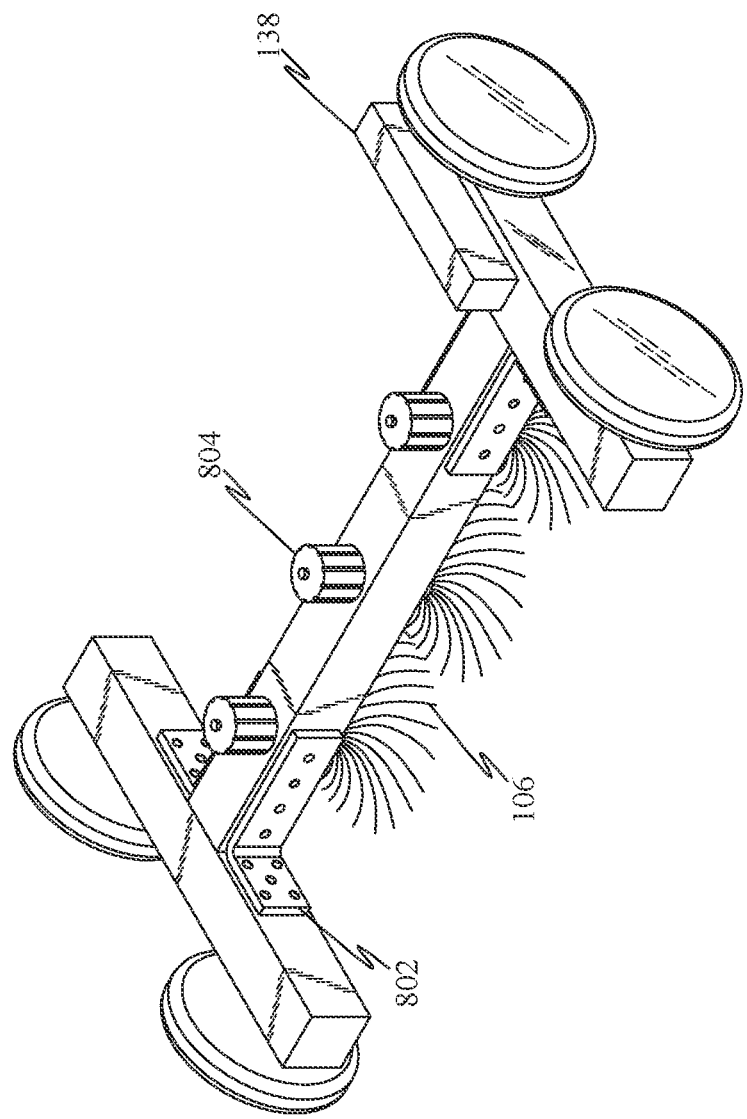
FIG. 8 is an isometric view of an alternate embodiment of the system 100, illustrating a modular framework enabled using brackets 802, in accordance with an embodiment.

A comparatively larger sized system 100 may be required to clean the surface of the solar panel 304 when the size of the solar panel 304 is large. Manufacturing and transportation of gigantic system may pose significant challenges. FIG. 8 illustrates an alternate embodiment of a system 100, depicting a modular configuration. The modular configuration comprises of a plurality of frames. The frames may be engaged together using a plurality of brackets 802. The brackets 802 and the frame may have a plurality of holes therein, configured to engage the frames through any of the disposed holes, enabling the system 100 to be configured according to the size of the solar panel. The system 100 comprises of a plurality of motors 804, each of which drive the rotating members 106 and the continuous tracks 104 or wheels 401 individually. The modular configuration of the system 100 enables easy transportation and maintenance of the system 100 in modules, also easing the assembly and disassembly of the system 100.

Power Transmission

Figure 2:
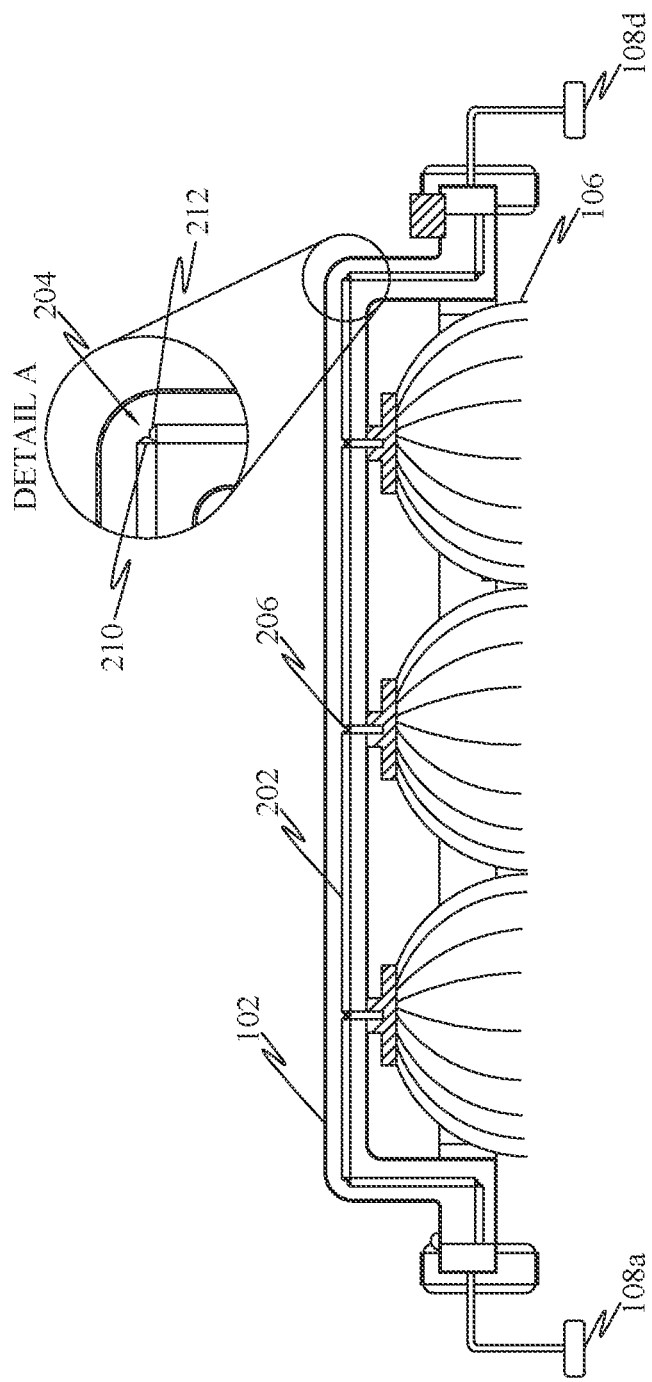
FIG. 2 is a section view of the system 100 of FIG. 1A, depicting the shaft 202 and the gear assemblies 204 and 206. In accordance with an embodiment.

In an embodiment, a single motor may be configured to drive the rotating members 106 and the continuous tracks 104 or wheels 401. The motor may be engaged to the frame 102. The motor 150 is connected to the battery unit 138. Referring specifically to FIG. 2, schematic of power transfer arrangement is discussed. Rotation of motor shaft is transferred to the rotating members 106 and the continuous tracks 104 or wheels 401 using an arrangement of shafts 202 and gear arrangement (204 and 206). The gear arrangement 204, 206 may be bevel gear arrangement. Alternatively, worm gear arrangement may be used, or a combination may be used. The motor may solitarily drive all the rotating members 106 and the continuous tracks 104. Since all the members are connected to the same motor using gear mechanism (204 and 206) the speed of all the members are interdependent on the speed of the motor. The speed would remain proportional throughout the system 100. The frame 102 may encompass the shafts 202, which run along the length of the frame 102. The rotating members 106 are attached to the shaft 202 by gear arrangement 206. The shaft 202 is also connected to the continuous tracks 104 by means of other gear arrangement 204. Alternatively, multiple motors may be used.

In an alternate embodiment as illustrated in FIG. 8, all the rotating members 106 and the continuous tracks 104 or wheels 401 may be individually driven by separate motors 804. The motors 804 may be powered by a battery 138 engaged on one side of the frame. Connection from the battery 138 to the motors 804 may be done externally.

Automation

It may be noted that, as recited earlier, the system 100 is engaged in cleaning the row of solar panels 304. The extent of cleaning may be measured to keep track of the efficiency of system in cleaning the solar panels 304. Furthermore, multiple systems 100 may be deployed over multiple rows 702 of solar table 306 in the solar farm 700. The systems 100 deployed may be operated centrally from a control room. The systems 100 may be programmed to work at a specific interval of time. In an embodiment, the system 100 may additionally programmed to meet a pre-set benchmark of cleanliness, such that the system 100 continues to perform its operation until the benchmark is met.

In an embodiment, sensors 112 may be employed to determine the performance and efficiency of the system 100. Sensors 112 may be disposed on opposite sides of the frame 102, wherein at least one sensor 112 is positioned towards the leading side 120 of the frame 102 and the other sensor 112 is positioned towards a trailing side 130 of the frame 102. The optical sensor 112 detects the amount of light reflecting off the surface of the solar panels 304, thereby calculating the extent of soiling. The sensors 112 positioned towards the leading side 120 of the frame 102 detect the amount of light reflection from the surface of the solar panel 304, which is used to determine the extent of foreign particles settled on the surface of the solar panels 304. Likewise, the data from the sensors 112 positioned towards the trailing side 130 of the frame 102 is used to determine the extent of de-soiling of the solar panels 304. The system 100 by itself, a controlling system by itself, or a human operator by way of input, may decide to continue traverse movement of the system 100 till the difference is within an acceptable value.

In an embodiment, instead of deploying sensors to determine the difference in values from them, one of more sensors 112 may be deployed, and the value(s) obtained from them may be compared against a benchmark. The system 100 by itself, a controlling system by itself, or a human operator by way of input, may decide to continue traverse movement of the system 100 till the benchmark is met. This embodiment reduces the number of sensors 112 used, thereby being more cost efficient. In an embodiment, based on quantum of soiling, the speed of the rotating members 106 is varied to perform cleaning.

In an embodiment, a control panel 132 is provided, which may include LED indicators 134 and start/stop switch 136. The LED indicators 134 may indicate the battery level and the status of the system 100. The start/stop switch may be is used to control the system 100.

The processes described above is described as a sequence of steps. This was done solely for the sake of illustration. Accordingly, it is contemplated that some steps may be added, some steps may be omitted, the order of the steps may be re-arranged, or some steps may be performed simultaneously.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention.

What is claimed is:

1. A system (100) for cleaning solar panels (304) arranged in a row, the system (100) comprising:
    a frame (102) configured to traverse along the row of solar panels (304);
    a plurality of rotating members (106) interfacing with surface of the solar panel (304), wherein, the plurality of rotating members (106) are connected to the frame (102) to move with the frame (102) along the row of solar panels (304); and
    a stationary brush (110) engaged to the frame (102), wherein the brush (110) interfaces with the surface of the solar panel (304) to unsettle foreign particles present on the surface of the solar panel (304), as the frame (102) traverses along the row of solar panels (304);
    the rotating members (106) are disposed in multiple rows (502 a), (502 b), (502 c) such that a rotating member (106) in one row is positioned between two rotating members (106) of its adjacent rows;
    an axis of rotation of the rotating members (106) is incident at an angle to a plane of the solar panels (304), wherein the angle is oblique;
    the system (100) comprises at least a pair of continuous tracks (104 a) and (104 b), each continuous track (104) disposed on opposite sides of the frame (102), wherein the pair of continuous tracks (104 a) and (104 b) enable movement of the frame (102) along the row of solar panels (304); and
    a plurality of suction ports (116), a plurality of air blowers (114) and a filter unit, wherein,
        the suction ports (116) are positioned towards the stationary brush (110) to suck the foreign particles unsettled by the stationary brush (110);
        the filter unit receives the air with the foreign particles and purifies the received air;
        purified air is supplied to the air blowers (114); and
        the air blowers (114) are positioned behind the rotating members (106) relative to a direction of movement (302) of the frame (102) along the row of solar panels (304), thereby causing the foreign particles unsettled by the rotating members (106) to be blown away.

2. The system (100) as claimed in claim 1, comprising:
    at least one support wheel (108) disposed on opposite sides of the frame (102), wherein, axis of rotation of the support wheel (108) is incident at an angle to the surface of the solar panel (304); and
    each of the support wheels (108) interfaces an edge (308) of a solar table (306) on which the solar panel (304) is mounted, wherein the support wheels (108) provide stability and support to the frame (102), when the frame (102) moves along the row of solar panels (304).

3. The system (100) as claimed in claim 1, wherein at least a part of the frame (102) positioned towards the stationary brush (110) defines the plurality of suction ports (116)

configured to suck air, thereby sucking in the foreign particles unsettled by the stationary brush (110).

4. The system (100) as claimed in claim 1, comprising the plurality of air blowers (114), thereby causing the foreign particles unsettled by the rotating members (106) to be blown away.

5. The system (100) as claimed in claim 1, comprising a pair of sensors (112), wherein one sensor (112) is positioned towards a leading side (120) of the frame (102) and the other sensor (112) is positioned towards a trailing side (130) of the frame (102), wherein input from the pair of sensors (112) is used to determine the extent of de-soiling of the solar panels (304).

6. The system (100) as claimed in claim 1, comprising a motor and at least a pair of wheels (401), wherein the motor drives all the rotating members (106) and the pair of wheels (401).

* * * * *